(12) United States Patent
Steinberg et al.

(10) Patent No.: US 9,641,674 B1
(45) Date of Patent: May 2, 2017

(54) IDENTIFYING WEBSITE ACTIVITIES AS BEING THOSE OF A TELEPHONE CALLER

(71) Applicant: Adpearance, Inc., Portland, OR (US)

(72) Inventors: David Steinberg, Portland, OR (US); Bryan N. Schoen, West Linn, OR (US); Dennis P. O'Connell, Portland, OR (US); Stephen F. Hornbrook, King City, OR (US); Geoffrey Shauger, King City, OR (US)

(73) Assignee: Adpearance, Inc., Portland, OR (US)

( * ) Notice: Subject to any disclaimer, the term of this patent is extended or adjusted under 35 U.S.C. 154(b) by 0 days.

(21) Appl. No.: 15/001,169

(22) Filed: Jan. 19, 2016

Related U.S. Application Data

(60) Provisional application No. 62/104,667, filed on Jan. 16, 2015.

(51) Int. Cl.
| | |
|---|---|
| *H04M 3/00* | (2006.01) |
| *H04M 5/00* | (2006.01) |
| *H04M 3/22* | (2006.01) |
| *G06F 17/30* | (2006.01) |

(52) U.S. Cl.
CPC .... *H04M 3/2281* (2013.01); *G06F 17/30876* (2013.01)

(58) Field of Classification Search
USPC ............. 379/265.01, 265.11, 266.01, 266.07
See application file for complete search history.

(56) References Cited

U.S. PATENT DOCUMENTS

| | | | |
|---|---|---|---|
| 6,418,471 B1 * | 7/2002 | Shelton | G06F 11/3495 707/E17.111 |
| 2005/0063530 A1 * | 3/2005 | Cook | H04L 29/06027 379/265.09 |
| 2010/0161540 A1 * | 6/2010 | Anisimov | G06Q 30/02 706/47 |
| 2012/0324375 A1 * | 12/2012 | Mathews | G06Q 30/0601 715/760 |
| 2013/0124641 A1 * | 5/2013 | Ryabchun | G06F 11/3495 709/206 |
| 2014/0126715 A1 * | 5/2014 | Lum | H04M 3/5133 379/265.09 |
| 2015/0071427 A1 * | 3/2015 | Kelley | G06Q 30/0202 379/265.09 |
| 2015/0281450 A1 * | 10/2015 | Shapiro | H04M 3/4878 379/265.09 |

\* cited by examiner

*Primary Examiner* — Quoc D Tran
(74) *Attorney, Agent, or Firm* — Stoel Rives LLP; Robert R. Teel

(57) ABSTRACT

Disclosed are systems and methods of identifying website activities of a webpage visitor as being those of a caller placing a telephone call to a published tracking telephone number presented as a substitute for a contact telephone number. The published tracking telephone number is presented as the substitute so that when a webpage visitor observes the published tracking telephone number and acts as the caller, the telephone call is non-disruptively forwarded to the contact telephone number for purpose of identifying the website activities as being those of the caller.

11 Claims, 9 Drawing Sheets

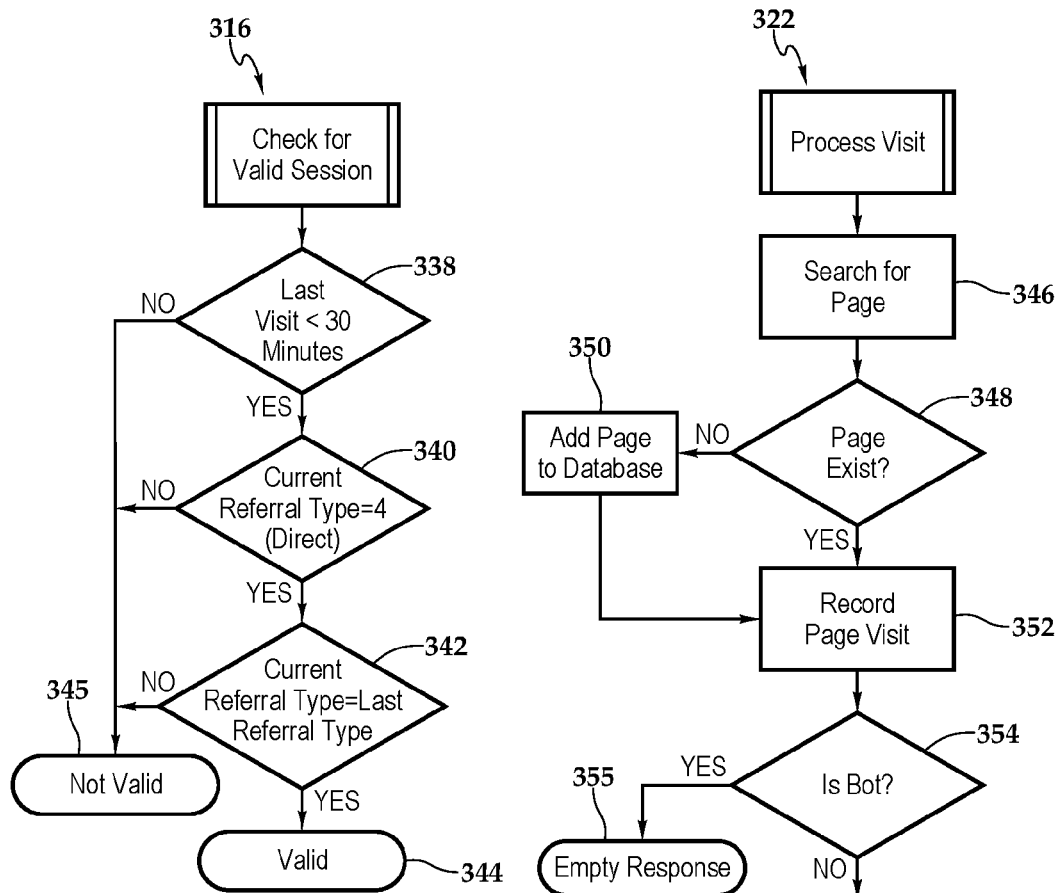
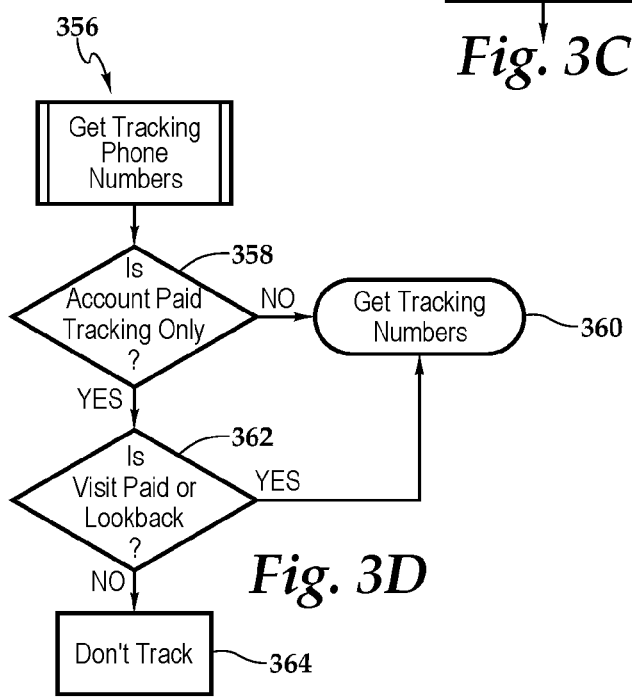

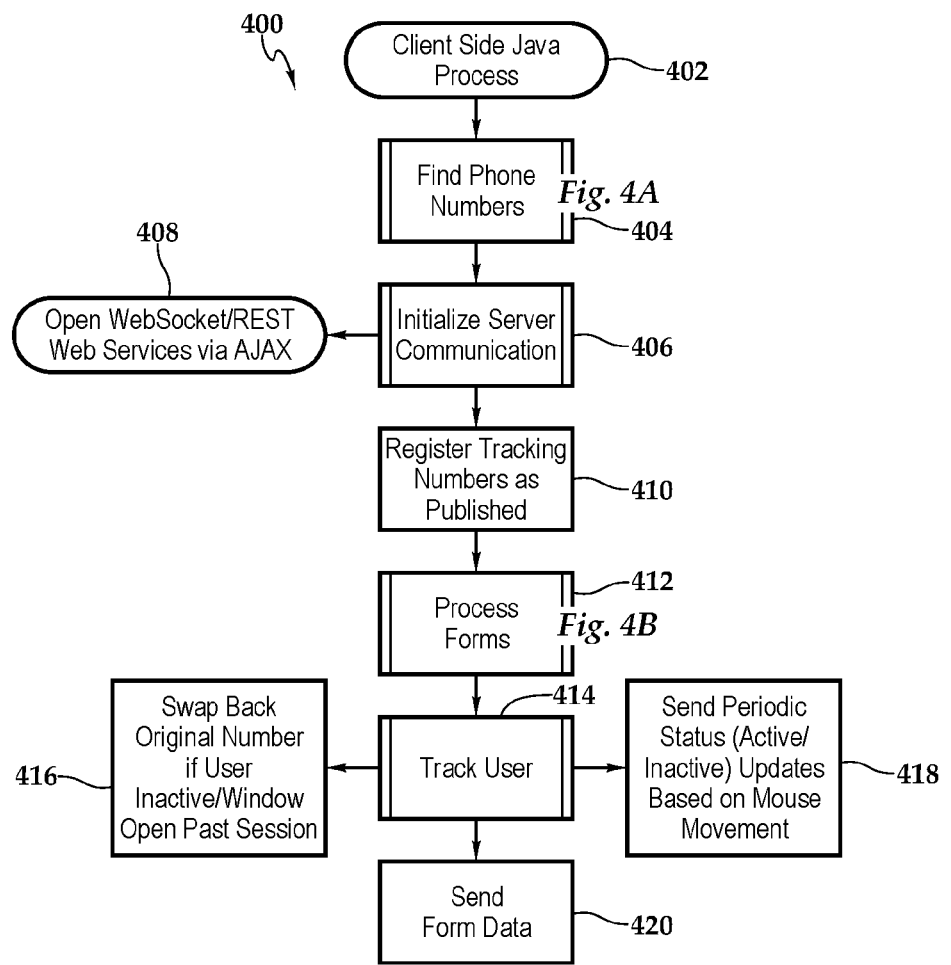
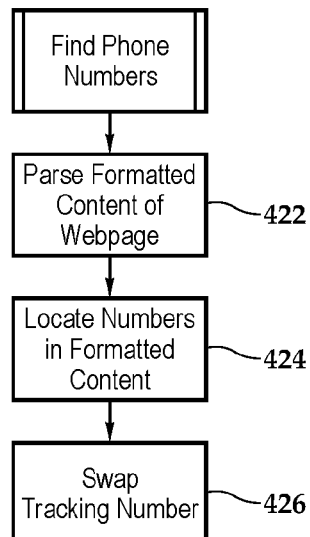
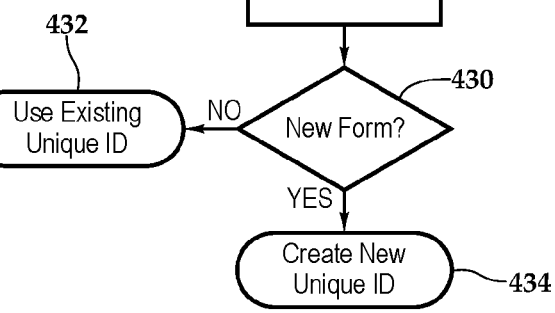
Fig. 4
Fig. 4A
Fig. 4B

US 9,641,674 B1

IDENTIFYING WEBSITE ACTIVITIES AS BEING THOSE OF A TELEPHONE CALLER

RELATED APPLICATION

This application claims benefit of U.S. Provisional Patent Application No. 62/104,667, filed Jan. 16, 2015, which is fully incorporated into this document by reference.

TECHNICAL FIELD

This disclosure generally relates to website analytics for tracking of webpage visitors, and, more particularly, to Internet-centric techniques for identifying Internet browsing activities of a specific shopper visiting an ecommerce website so as to associate those activities as being those of a telephone caller placing a telephone call to a tracking telephone number presented on a webpage of the website.

BACKGROUND INFORMATION

Certain website owners list a telephone number as contact information on one or more webpages of the website. Visitors to the webpage may then observe the telephone number, call it, and reach an agent of the website owner. For website owners having salespersons seeking to develop credible potential buyers (also called sales leads, or simply, leads), current website tracking and promotional telephone numbers that route telephone calls through a third-party advertisement tracking service offer little real-time information by which to market to and cultivate sales from leads.

SUMMARY OF THE DISCLOSURE

In a website including a contact telephone number configured to be presented as formatted content of a webpage of the website, disclosed are systems and methods for identifying website activities of a webpage visitor as being those of a caller placing a telephone call to a published tracking telephone number presented as a substitute for the contact telephone number. The published tracking telephone number is presented as the substitute so that when the webpage visitor observes the published tracking telephone number and acts as the caller, the telephone call is non-disruptively forwarded to the contact telephone number for the purpose of identifying the website activities as being those of the caller. Such identification is made possible according to features and embodiments summarized as follows.

A set of telephone numbers is obtained from a provider of telephony infrastructure (e.g., Twilio), the telephony infrastructure configured to facilitate connectivity between networked devices—e.g., computers communicatively coupled by Internet connectivity to share hypertext transfer protocol (HTTP) messages—and a public switched telephone network (PSTN).

Allocated from the set of telephone numbers is a pool of tracking telephone numbers made available as substitutes for the contact telephone number. The pool of tracking telephone numbers is sized to include a quantity of numbers that is based on traffic volume of the webpage.

Provided by a user tracking system ("UTS," or simply tracking system), for transmission from a website server of the webpage to a client browser visiting the webpage, is a first set of machine-readable instructions that, when performed by the client browser, configure the client browser to communicate with the tracking system and obtain from it further instructions to swap, in response to the webpage visitor visiting the webpage, the contact telephone number with the published tracking telephone number selected by the tracking system from the pool of tracking telephone numbers. The swap is made such that the published tracking telephone number appears in the webpage as the formatted content.

Information is then stored in a database of the tracking system. For example, the information indicates that the published tracking telephone number has been presented to the webpage visitor as the substitute for the contact telephone number. Also, the website activity is tracked as well (e.g., by also storing that information in the database).

Provided by the tracking system, for configuring a call-processing application server of the provider of the telephony infrastructure, is a second set of machine-readable instructions. When performed by the call-processing application server, these instructions configure the call-processing application server to send a network request to the tracking system in response to receiving the telephone call placed to the published tracking telephone number. The network request, which may be an HTTP endpoint request or a message under various other network protocols, includes information identifying the published tracking telephone number and caller details. The caller details include a caller telephone number originating the telephone call, a name associated with the caller telephone number, a geographic location associated with the caller telephone number, or subcombinations of these details.

In response to receiving the network request, the database is searched for the published tracking telephone number so as to retrieve the contact telephone number associated with it and to thereby associate the caller details with the webpage visitor and website activities thereof (generally referred to as tracking data). The call-processing application server is then provided the contact telephone number retrieved from the database to thereby cause the call-processing application server to forward the telephone call to the contact telephone number.

Also disclosed is a UTS to track tracking data including information such as, but not limited to: pages viewed, visit times, duration of visits or of page views, data input into web forms, search entries, and other information. Additionally, the UTS may determine personal information about the webpage visitor and associate this personal information with other tracking data obtained during visits to the associated website. The tracking data is provided to an agent (e.g., a sales agent or a customer service representative) of the website owner. For example, when a webpage visitor for which tracking data has been recorded places a telephone call to a tracking telephone number, the UTS may incorporate the call details (and even the recorded call itself) into the tracking data, and then provide relevant tracking data for contemporaneous review by the recipient of the telephone call. In some embodiments, the UTS may provide a database of tracking data for review by the agent.

In some embodiments, the UTS associates the tracking data with a user by providing the user with an assigned tracking telephone number through which the user may call the service. This assigned telephone number may be assigned from a pool of assignable tracking telephone numbers that may then be used to forward a call to a direct telephone number for the service. In some embodiments, the assigned tracking telephone number may be forwarded to a forwarding telephone number (e.g., a predetermined, conventional tracking telephone number), such as in cases where a separate promotion is used to drive potential customers to use the service. In such embodiments, the separate promotion may still forward telephone calls to an original contact telephone number and thus provide for separate tracking of activity through the promotion.

In some embodiments, the UTS is configured to assign tracking telephone numbers to users based on information related to the user's tracking data. For example, the information might include a time since the user has last visited, whether a user has stayed active at the service's website, times of how long since the tracking telephone numbers have been used, or other information. In various embodiments, the user may be provided with the tracking telephone number by modification of the website for the service to include the assigned tracking telephone number instead of a direct telephone number (or forwarding telephone number) by the UTS.

The present disclosure generally describes embodiments that tie telephone calls back to original website activity of the caller. Accordingly, website owners or recipients of the calls may be provided valuable information to assess (1) from what tracking telephone number and particular website a sales lead had originated, and (2) whether a telephone caller is a viable potential buyer. Additional technical challenges addressed in this disclosure include (3) tracking numerous different website users at low expense (i.e., tracking them with a pool of tracking telephone numbers that has fewer telephone numbers than the number of different website uses), and (4) tracking in a manner that does not compromise the integrity of an existing legacy tracking telephone system using predetermined tracking telephone numbers. Additional aspects and advantages will be apparent from the following detailed description of embodiments, which proceeds with reference to the accompanying drawings.

BRIEF DESCRIPTION OF THE DRAWINGS

FIGS. 3, 3A, 3B, 3C, and 3D are flow diagrams showing a process of providing, from a tracking system to a client (Internet) browser, machine-readable instructions in the form of a JavaScript file that, when performed by the client Internet browser, configure the client browser to communicate with the tracking system and obtain from it further instructions to swap a contact telephone number with a tracking telephone number.

FIGS. 4, 4A, and 4B are flow diagrams showing a process of tracking website activities (e.g., form submission) and swapping, in response to a webpage visitor visiting a webpage, a contact telephone number with the published tracking telephone number selected by the tracking system from the pool of tracking telephone numbers such that the published tracking telephone number appears in the webpage as a formatted content of the webpage.

DETAILED DESCRIPTION OF EMBODIMENTS

When a website owner lists a contact telephone number of the website owner (or promoter providing a predetermined tracking telephone number), a number of telephone calls placed to the contact telephone number may be counted to gauge market interest in a particular service offering advertised on a webpage. For example, in some embodiments, the website owner may obtain a predetermined tracking telephone number and list that information on a webpage so that the number appears to webpage visitors as contact information for inquiries concerning the service. More specifically, auto dealerships routinely advertise automobiles, such as preowned vehicles, on webpages of dealership websites. Some advertisements will include a predetermined tracking telephone number (e.g., a telephone number provided by Autotrader® or another third-party marketing service) as contact information for inquiries concerning a dealership's advertised sale of a particular vehicle. Accordingly, when a webpage visitor then calls the predetermined tracking telephone number, Autotrader increments a count of a total number of callers that have placed telephone calls to the predetermined tracking telephone number, and forwards the telephone call to another telephone number maintained by the website owner. In the previous example, Autotrader forwards the telephone call to the dealership's sales desk telephone number.

Although previous telephone caller tracking systems attempted to track a telephone call placed to a predetermined tracking telephone number, such previous systems have thus far lacked an ability to associate a specific webpage visitor with a telephone caller. In other words, although the previous systems could count a total number of calls, they could not provide the website owner with more detailed information concerning what each telephone caller had been viewing on the website prior to placing a telephone call. For website owners having salespersons seeking to develop credible potential buyers (also called sales leads, or simply, leads), the conventional predetermined tracking telephone numbers offer little real-time information by which to market to and cultivate sales from leads.

Figure 1:
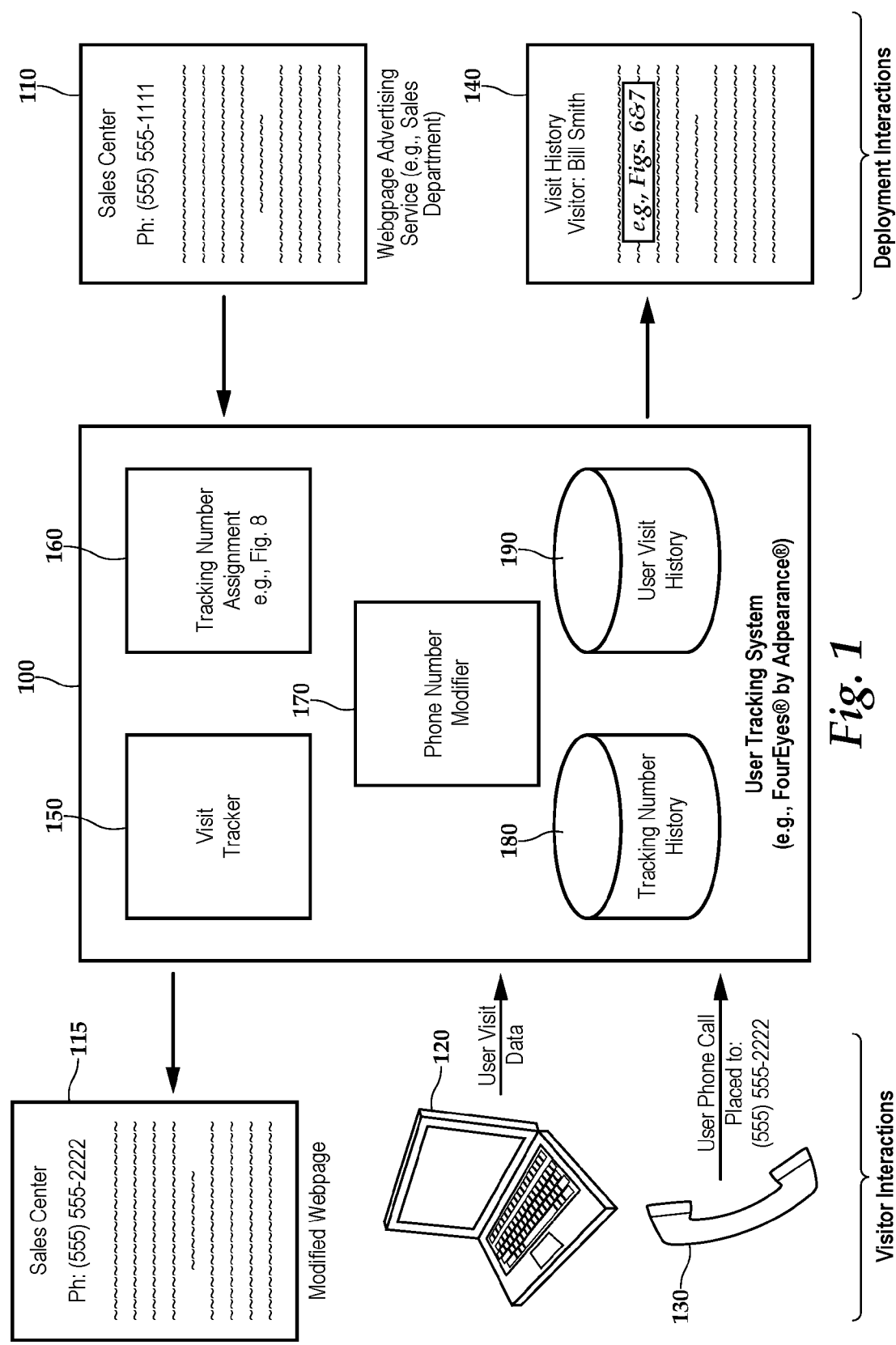
FIG. 1 is a block diagram of a tracking system, according to one embodiment.

FIG. 1 shows an example arrangement for a UTS 100. According to one embodiment, the UTS 100 is provided to website owners for deployment in the form of software as a service (SaaS). The SaaS is generally referred to by the trade name FourEyes®, available from Adpearance, Inc. of Portland, Oreg., which is the assignee and applicant of the present application.

The UTS 100 modifies a webpage 110 of a website including one or more telephone numbers that a webpage visitor may ordinarily call for contacting an agent of the website owner in connection with inquiries regarding services shown on the webpage 110. In FIG. 1, a sales department service is customarily associated with contact information including a (555) 555-1111 telephone number that is maintained by the service provider. Thus, the (555) 555-

1111 telephone number normally provides direct access to agents of the service provider.

In other embodiments, the (555) 555-1111 telephone number may be a telephone number associated with a promotional service advertised on the webpage 110. For example, the (555) 555-1111 telephone number may be a predetermined tracking telephone number provided by a third-party promoter that maintains a conventional telephone caller tracking system. In such scenario, the third-party promoter would simply forward a telephone call placed to the (555) 555-1111 telephone number to a website owner's own telephone number so as to track the number of callers that view the promotion and call to inquire about it. Thus, the tracking telephone numbers may forward telephone calls to a direct telephone number for the service or to a forwarding telephone number for the service, depending on whether a promotional service with its own associated tracking telephone number is used.

As noted above, tracking in a manner that does not compromise the integrity of any existing legacy tracking telephone system is contemplated in this disclosure. Nowadays, sales companies frequently use previously deployed conventional tracking systems that do not track website activities. Such companies may not want to switch to a more advanced tracking system before the companies can assess whether the advanced tracking system offers additional value. For example, if auto dealerships use tracking telephone numbers provided by Autotrader, the dealerships may want to ensure that telephone callers will be forwarded to legacy tracking numbers. Therefore, the present disclosure contemplates forwarding to third-party tracking telephone number because those may also be readily overlaid with Adpearance tracking telephone numbers.

The UTS 100 provides machine-readable instructions to a website server such that a modified webpage 115 is generated for a webpage visitor. The modified webpage 115 may include one or more tracking telephone numbers that may be used by a user to contact the service. For example, in FIG. 1, the modified webpage 115 includes the tracking telephone number (555) 555-2222 that is swapped in place of the direct telephone number of (555) 555-1111 that was originally included in the unmodified webpage 110.

A user may view the modified webpage 115 on a computer 120, which may include various types and form factors of computers, mobile devices, or other networked devices. From the perspective of a webpage visitor viewing the computer 120, the tracking telephone number (555) 555-2222 simply appears as one of the webpage's own contact telephone numbers because the modified webpage 115 substitutes the tracking telephone number at the same location as that of the original direct telephone number, and the content of the tracking telephone number is presented with the same visual style as that of the original direct telephone number. It has the same visual style because the content is formatted with the identical HyperText Markup Language (HTML), Cascading Style Sheets (CSS), or other formatted content as that of the original direct telephone number. In some embodiments, the tracking telephone number may replace or otherwise obscure the telephone number originally appearing in the unmodified webpage 110 such that a webpage visitor may not be aware that the modified webpage 115 is using a tracking telephone number. In such embodiments, a user who is being tracked may not be aware they are being tracked, or may be provided with a website browsing experience that is substantially similar or identical to an experience that would be obtained from visiting the unmodified webpage 110.

The UTS 100 may be configured to collect user visit data relating to visits to the modified webpage 115 by the user. The user visit data may be recorded across a single visit to the modified webpage 115 and/or multiple visits. In various embodiments, the user visit data may be collected for a single user that visits different versions of the modified webpage 115, such as if content in the modified webpage 115 has been updated or if the user has been given more than one different tracking telephone numbers.

The user may later call the service, such as by placing a telephone call 130 to the tracking telephone number presented on the modified webpage 115. In response, the telephone call may be forwarded to a telephone number for the service and connected to a person associated with the service. The UTS 110, in response to receipt of the telephone call, provides a visit history 140 showing user visit data to one or more persons associated with the service. The visit history 140 may be provided contemporaneously to the person receiving the telephone call so that the person receiving the telephone call may view the visit history 140 while speaking with the user on the telephone. In other embodiments, the visit history 140 may be provided before any call is received or after one or more calls are received. Some examples of the visit history 140 are provided in FIGS. 6 and 7 and associated description.

The UTS 100 may include one or more modules—which may be implemented through hardware or software (i.e., or both, in which "or" in this disclosure is an inclusive disjunction not to be interpreted as meaning a mutually exclusive "or," unless related terms are clearly mutually exclusive)—to perform activities described in later paragraphs. For example, the UTS 100 may include a visit tracker 150, which may be configured to record user visit data during one or more visits to the modified webpage 115. The visit tracker 150 may perform such recording in a background task or other unobtrusive manner as the user visits the modified webpage 115. For example, recording may be performed by way of a WebSocket protocol (e.g., a secure WebSocket) between the computer 120 and the UTS 100.

The UTS 100 may also include a telephone number modifier 170 which may be configured to provide instructions (e.g., JavaScript) that allow the computer 120 to modify the unmodified webpage 110 and thereby present to a user the modified webpage 115. Such modification may include the substitution (or other inclusion) of one or more tracking telephone numbers for telephone numbers in the unmodified webpage 110. In various embodiments, the UTS 100 may also include a tracking telephone number assignment 160 (see, e.g., FIG. 8), which may be configured to assign a pool of tracking telephone numbers to a particular contact telephone number. The telephone number modifier 170 may thereafter produce a customized JavaScript file for the computer 120 to use to publish a tracking telephone number selected from the pool.

The UTS 100 may also include storage for data utilized by the modules, such as tracking telephone number history 180 and user visit history 190. According to some embodiments, the history 180 and history 190 are stored in a database of the UTS 100.

Figure 2:
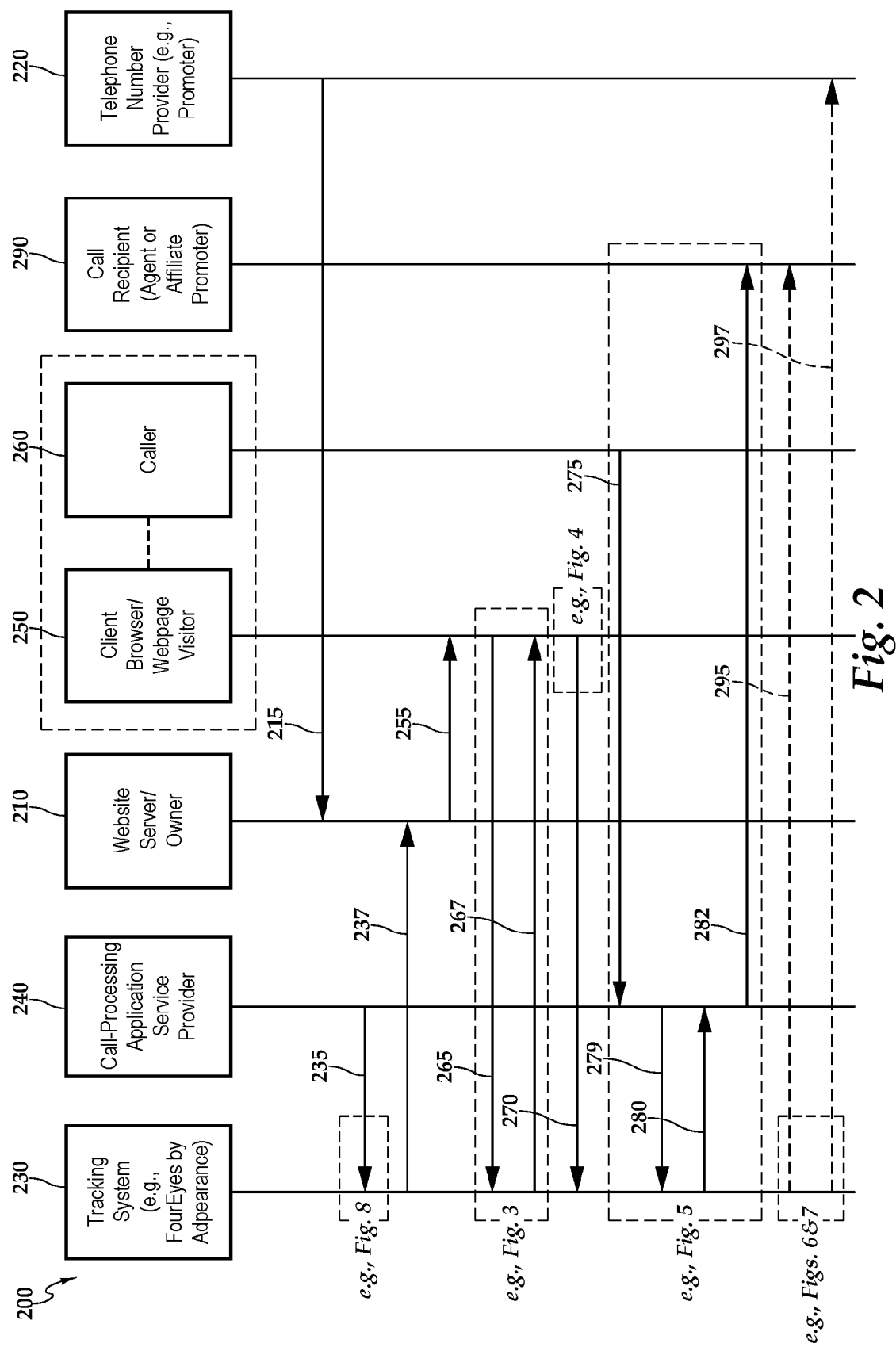
FIG. 2 is a sequence diagram showing flow of control and data among entities used in cooperation with the tracking system of FIG. 1 for identifying and reporting website activities as being those of a telephone caller placing a call to a published tracking telephone number.

FIG. 2 is a flow diagram 200 showing an example of interactions between various entities involved in associating caller details with website activities. Skilled persons will recognize the specific sequence of these interactions may vary from the sequence shown in FIG. 2.

Initially, a website owner (or website server) 210 receives 215 a contact telephone number from a telephone number provider 220. If the telephone number provider 220 is, for example, a telephone company or a provider of PSTN services, then the website owner 210 may deploy the contact telephone number as a direct telephone number (e.g., a business telephone number). In another embodiment, the telephone number provider 220 is provided by a third-party marketing company, in which case the contact telephone number is a forwarding number for conventional tracking services. In either case, the contact telephone number is configured to be presented by the website server 210 as formatted content of a webpage served on the website.

As described previously, a tracking system 230 (which may be the UTS 100, FIG. 1) identifies website activities of a webpage visitor as being those of a caller placing a telephone call to a published tracking telephone number presented as a substitute for the contact telephone number. The published tracking telephone number is presented as the substitute so that when the webpage visitor observes the published tracking telephone number and acts as the caller, the telephone call is non-disruptively forwarded to the contact telephone number for purpose of identifying the website activities as being those of the caller. Accordingly, the tracking system 230 is configured to obtain 235 a set of telephone numbers from a provider 240 of telephony infrastructure. The provider 240 facilitates connectivity between networked devices and a PSTN. For example, Twilio, of San Francisco, Calif., offers an application programming interface (API) that allows the tracking system 230 to purchase a set of telephone numbers that are used for tracking purposes. For example, Adpearance representatives visit twilio.com, create an account associated with a credit card, and receive from Twilio API credentials. The API credentials are used in Adpearance configuration software to authenticate Adpearance communications with a Twilio server, and thereby allow the Adpearance server to complete a purchase of a set of telephone numbers for use with one or more Adpearance customers (also called Adpearance account holders, or simply accounts).

The tracking system 230 allocates from the set of telephone numbers a pool of tracking telephone numbers available as substitutes for the contact telephone number. A pool corresponds to a type of contact telephone number. For example, if a webpage displays different telephone numbers for sales and service departments, then a pool is typically defined for each type of contact telephone number. In other words, two separate pools of tracking telephone numbers are created to accurately associate calls to either sales or service.

Tracking numerous different users at low expense is facilitated by intelligently managing a pool of tracking telephone numbers. If a client of the disclosed tracking system has 1,000 visitors per month, hypothetically, it would be relatively straightforward to have a pool of 1,000 numbers and give each user their own tracking telephone number. Until a first user is finished, i.e., until he is off the website, that number is checked out exclusively to the first user. When a second user visits, he is also checked out a different number, and so forth. In practice, such an approach would be cost prohibitive because obtaining the 1,000 tracking telephone numbers would be expensive. Furthermore, eventually all the available numbers would be checked out leaving no numbers available for more recent visitors because many people nowadays visit a website, and do not leave the website for some extended time. For example, users may load a webpage in a tab of their Internet browser and maintain the tab in the background for a relatively long visit. Accordingly, the pool of tracking telephone numbers is sized to include a quantity of numbers that is based on traffic volume of the webpage. For example, Adpearance representatives will typically monitor a website (or a particular page of the website) over a week-long period to assess an average traffic volume. To ensure accurate webpage call tracking attribution, an allocated number of tracking telephone numbers is determined by how much Internet traffic the website receives per day. Traffic is based on unique website users, visits, and page views. This process allows Adpearance to collect information on how many visits a website receives in any given day. Through experiments in collecting website analytics across multiple websites, the applicant has surmised that an average website receives 95% of its traffic between the hours of 6 a.m. and 10 p.m. (16 hours). An average website's peak traffic is about 28% higher than its average traffic. Further, the average visit duration is 30 minutes.

Using the above information, if visitors visit a website, one after another, for 30 minutes each over the span of 16 hours, this equates to 32 website visits per day. Accordingly, for each defined pool, if an account were to have one allocated tracking telephone number, this one number would be sufficient to accurately track telephone calls back to the correct website visitor. This is so because when the first website visitor visits the website, they would be published the tracking telephone number. If they called the tracking telephone number during the period of their visit (e.g., 30 minutes), then the tracking system 230 could readily associate the telephone call to the last visitor who was published the tracking telephone number, which would be that aforementioned visitor. When their visit ends, a new visitor would visit for about 30 minutes and the same tracking telephone number could be published to the new visitor. If that new visitor called the tracking telephone number, then they would be attributed the telephone call under the foregoing principles.

In another example, assume that a website receives 64 visitors per day. Using the same principles as above, each pool should have at least two tracking telephone numbers, as the first visitor would be published the first tracking telephone number, and right after that the second visitor would be published the second tracking telephone number. If either was to call their respective tracking telephone number, then the two telephone calls could be correctly attributed to the respective visitor because they were last published their respective tracking telephone number.

The above examples may be expanded according to the following heuristic: each pool has (x/32) tracking telephone numbers, where x is the average website visits the website receives per day. But, as noted previously, (x/32) does not always account for peak traffic conditions. Therefore, the actual quantity of tracking telephone numbers per pool is about 28% higher than the nominal case, i.e., 1.28*(x/32). For example, if a website receives 250 visits per day, each pool would have 1.28*250/32 tracking telephone numbers (10 tracking telephone numbers), 500 visits per day equates to 20 tracking telephone numbers per pool, and so forth.

As an aside, it is noted that most websites do not experience a substantial change in traffic volume, and traffic volume is somewhat predictable for that reason. Nevertheless, skilled persons will appreciate that, in some embodiments, the size of various pools may be dynamically increased or decreased to accommodate changes in traffic volume. Moreover, the set of purchased numbers may also be expanded or decreased by implementing on-demand purchasing of telephone numbers from Twilio or other providers.

The tracking system 230 provides 237 a first set of machine-readable instructions. According to one embodiment, the first set of instructions are JavaScript. The JavaScript is initially downloaded to a client Internet (or web) browser application 250 in response to the webpage visitor 250 loading the webpage that has the JavaScript. In other words, the first set of instructions are conveyed 255 from the website server 210 of the webpage to the client browser 250 visiting the webpage so that the client browser 250 begins to communicate with an Adpearance server. Thus, the initial JavaScript, when performed by the client browser 250, configures the client browser 250 to communicate 265 with the tracking system 230 so as to obtain from it further instructions for tracking activities and swapping telephone numbers. The further instructions, which may also be in the form of JavaScript conveyed 267 back to the client browser 250, thereby configure the client browser 250 to swap the contact telephone number with the published tracking telephone number selected by the tracking system 230 from the pool of tracking telephone numbers such that the published tracking telephone number appears in the webpage as the formatted content. Additional information on the swap is provided in connection with the description of FIG. 3.

Once the client browser 250 is configured to communicate with the tracking system 230, the tracking system 230 stores 270 in a database of the tracking system 230 information indicating that the published tracking telephone number has been presented to the webpage visitor 250 as the substitute for the contact telephone number. Also, the tracking system 230 begins tracking the website activities. Additional details are described with reference to FIG. 4.

Eventually, a caller 260 may observe the published tracking telephone number and decide to place a call 275 to it so that the call arrives at a call-processing application server of the provider 240. But previously, the tracking system 230 has provided to the call-processing application server (e.g., during a configuration process in connection with obtaining 235 the set of telephone numbers), a second set of machine-readable instructions that, when performed by the call-processing application server, configure the call-processing application server to send 279 a network request to the tracking system 230 in response to receiving the telephone call placed 275 to the published tracking telephone number. The network request, which may include a HyperText Transfer Protocol (HTTP) endpoint request, includes information identifying the published tracking telephone number and caller details. For example, the caller details include a caller telephone number originating the telephone call (so-called caller ID), a name associated with the caller telephone number, and a geographic location associated with the caller telephone number.

In response to receiving the network request, the tracking system 230 searches its database for the published tracking telephone number to retrieve the contact telephone number associated with it and to associate the caller details with the webpage visitor 250 and website activities thereof. For example, the tracking system 230 determines the latest webpage visitor 250 to have been presented with the published tracking telephone number. The latest webpage visitor 250 (and their tracked website activities) is then identified as the caller 260.

The tracking system 230 provides 280 to the call-processing application server the contact telephone number retrieved from the database. For example, the tracking system 230 transmits an EXtensible Markup Language (XML) file (using the Twilio API) that includes information causing the call-processing application server to forward 282 the telephone call to the contact telephone number listed in XML-formatted content. The call is then non-disruptively received by the call recipient 290, which may be an agent of the website owner 210 or (in the case of a forwarding number) a promoter, such as Autotrader.

Figure 6:
FIGS. 6 and 7 are illustrations of screenshots of a tracking system user interface showing, respectively, summary and chronological views of activities of a sales lead having been identified based on website activities and telephone caller details.
Figure 7:
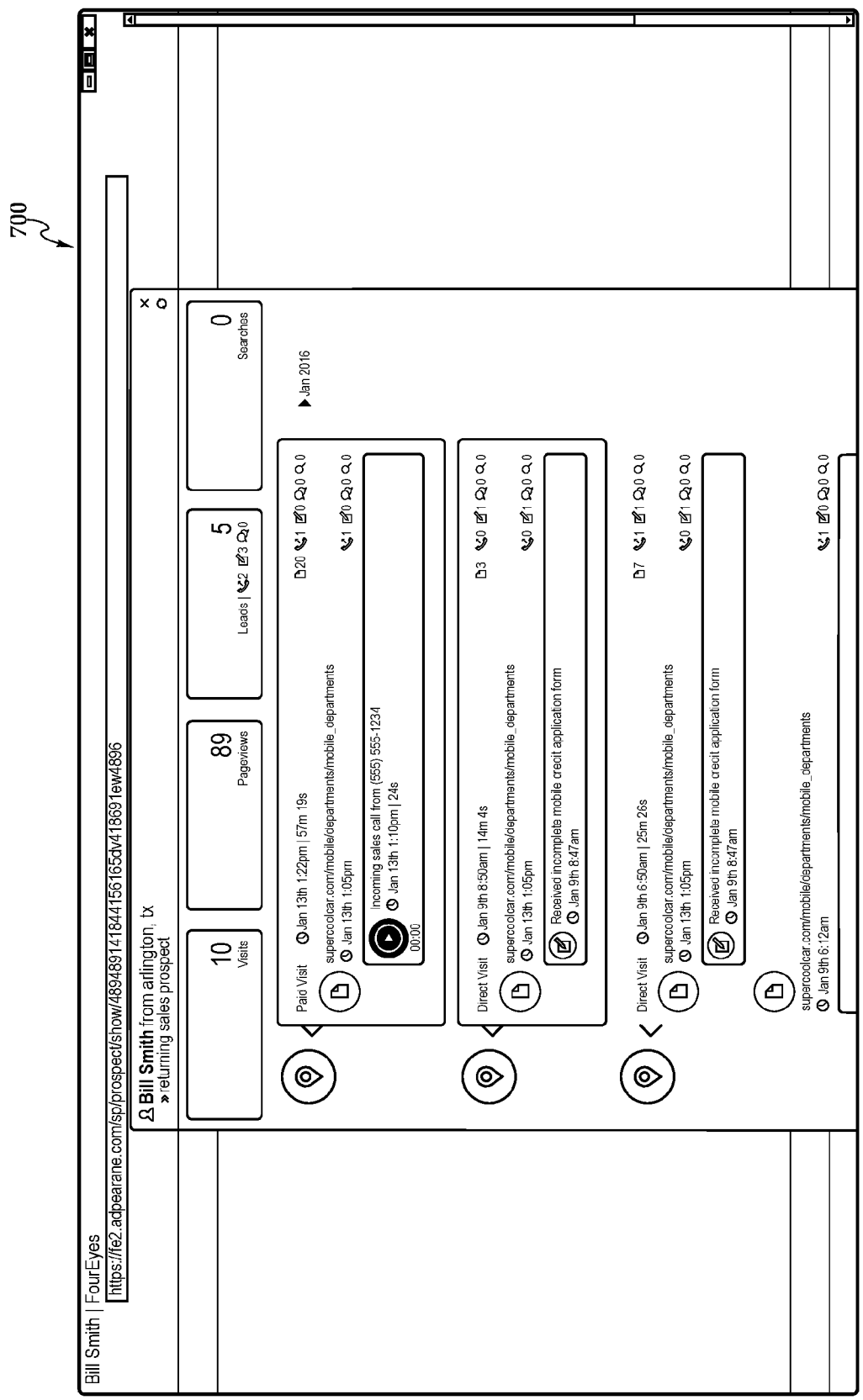

Optionally, FIG. 2 shows that the call recipient 290 may receive 295 tracking information shown in FIGS. 6 and 7. For example, to assess how the call was generated, an account holder of the disclosed technology, such as, for example, an auto dealership, is provided with information indicating whether a buyer's call was developed by a third-party (e.g., Autotrader or Google) advertisement placement. Thus, the user may determine how many telephone calls they have received in connection with various advertising channels, and thereby deploy advertising expenditures on the most efficient advertising platforms. Similar tracking information may be provided 297 to the third-party promoter 220.

Figure 3:
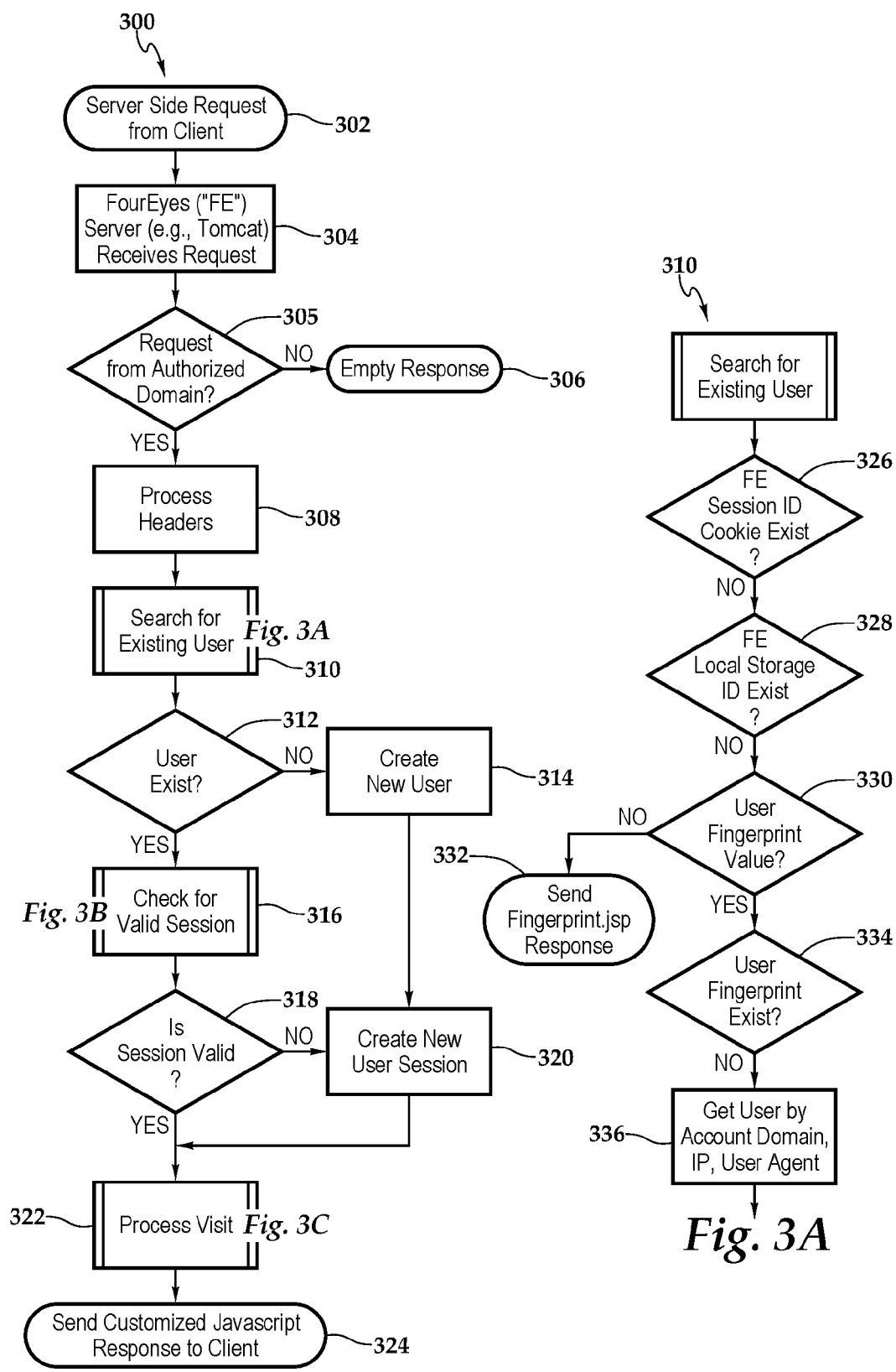

FIG. 3 is a main flow diagram showing a process 300 of providing, from a tracking system to a client (Internet) browser, machine-readable instructions in the form of a JavaScript file that, when performed by the client Internet browser, configure the client browser to communicate with the tracking system and obtain from it further instructions to swap a contact telephone number with a tracking telephone number. The main flow diagram of FIG. 3 is described first, followed by description of associated subprocesses shown in FIGS. 3A, 3B, 3C, and 3D.

Initially, the process 300 begins at step 302 with an HTTP request from a client browser that had received the aforementioned initial JavaScript. An Adpearance ("FourEyes" or "FE") server receives 304 the HTTP request. The FE server may be any type of web-compatible server, such as a Tomcat server, Apache server, and the like. Tomcat, for example, includes a servlet that accepts requests and sends responses based on defined Java objects. Included with the request are a set of headers which contain different values, such as a Uniform Resource Locator (URL) identifying a networked device requesting information from the FE server. In the present example, the set of headers would typically include a URL identifying an account holder's domain.

The FE server then determines 305 whether the HTTP request has been originated in connection with an authorized domain. In other words, the FE server discerns whether the HTTP request has header information indicating that the client browser has visited a webpage of an account holder. If not, then the FE server responds 306 with an empty response and the process terminates. If so, then additional header information is processed 308 to attempt to obtain a tracking cookie and a unique session identification (ID), which (if available) are included as standard header information.

The processed header information is used in a search 310 for an existing user, i.e., a previously identified webpage visitor. If it is determined 312 that the user does not exist, the new user is created 314 in an Adpearance database. If the user does exist, then the FE server checks 316 whether the current (browsing) session is valid.

If it is determined 318 that the session is not valid, then a new session is created 320 in the Adpearance database. Otherwise, the FE server processes 322 the visit to, among other things, select tracking telephone numbers that should be published. With the numbers selected, a customized JavaScript file is transmitted 324 to the client browser so as to configure the browser application to swap telephone numbers and initiate related tracking capabilities.

FIG. 3A shows in greater detail a process 310 for searching for existing users. First, the FE server determines 326 whether a tracking cookie is available in the header parameters. This tracking cookie, if available, would identify the user. For example, the tracking cookie may contain a unique Session ID comprising a random byte string of length 32, and keyed by an account domain ID.

If it is not available, the FE server determines 328 whether other identification exists in local storage. That local storage information, if available, would also identify the user, but this information is used as a fallback for the tracking cookie. Although local storage may store a unique tracking key to be identified by FourEyes, it is obtained by way of the local JavaScript on the user's machine, and then sent back to the FE server. In other words, local storage is not directly or immediately accessible to the FE server (e.g., in a header) but is instead accessible by further communications made to the client browser. Also, local storage is not supported by all client browsers.

If local storage information is not available, another fallback is to check for a user fingerprint. A fingerprint is not entirely unique, but it is fairly specific to a particular webpage visitor because it is obtained from the user's browser and comprises a representation of screen resolution, color depth, native language, plug-ins, supported mime types, supported features (such as local storage and session storage), and timezone settings. This fingerprint may be paired with the browser's user-agent string and Internet-protocol (IP) address of a requesting party. Thus, the FE server determines 330 whether a fingerprint is available. If not, then the FE attempts to access local storage or obtain fingerprint value information by sending 332 additional JavaScript ("Fingerprint.jsp") that requests the appropriate information from the client browser. After such a request is made, the client browser restarts the process 300, at which point steps 328 or 330 may, respectively, determine local storage or fingerprint value information is available by which to identify the user. For example, as shown in FIG. 3A, the FE server determines 334 whether a fingerprint has been generated based on the fingerprint value information returned by the client browser. If not, then the FE server gets 336 a user based on the IP address and user-agent alone.

FIG. 3B shows a process 316 for checking whether a session is valid. In short, the FE server determines 338 whether this visit is within the threshold period (e.g., within 30 minutes of the last visit). If so, then the FE server determines 340 whether this visit has the proper referral type (e.g., direct, organic search, or other referral type). If so, then the FE server determines 342 whether this visit has the same referral type as that of the previous visit. If each of the previous checks is determined to be true, then the session is valid 344 such that no new session should be created. Otherwise, the session in not value 345. Session information is included as part of the reported website analytics data.

FIG. 3C shows a process 322 for handling a user visit by building a database of the available webpages on the website, suppressing publication of tracking telephone numbers to an Internet bot web crawler (thus reducing the quantity of numbers allocated for a pool), and providing tailored instructions to the client browser that allow the browser to deploy selected tracking telephone numbers. Initially, steps 346, 348, 350, and 352 attempt to recognize whether a webpage has been previously viewed. If not, the webpage is added to the tracking database so that views of the new webpage can be recorded.

The FE server determines 354 whether a webpage visitor is a bot. Some bots include a user-agent identifier that indicates the webpage visitor is indeed a bot. Other bots can be identified based on IP address or other information indicating that the FE server should ignore the webpage visitor. If a bot is detected, an empty response is provided 355 and the process terminates. If the visitor is not a bot, then the FE server attempts to select 356 tracking telephone numbers.

FIG. 3D shows a process 356 for selecting tracking telephone numbers. The process includes determining 358 whether the account holder seeks to track a subset of telephone calls. For example, some auto dealerships seek to track performance of predetermined tracking telephone numbers (forwarding numbers) from promoters like Google or Autotrader. If not (e.g., the auto dealership tracks all telephone calls), then tracking telephone numbers are selected 360 from the appropriate previously configured pools. Selection may be based on the numbers that have been unpublished for the longest duration. In other words, the FE server may maintain a first-in first-out queue for numbers of each pool. The numbers having the oldest publication are first out of the queue. On the other hand, if the account holder tracks a subset of telephone callers or user visits, then the FE server determines 362 whether the present visit is attributable to a paid advertisement (or a lookback of one). In cases where it is not, then the FE server does not track 364.

FIG. 4 is a main flow diagram showing a process 400 of tracking website activities (e.g., form submission) and swapping, in response to a webpage visitor visiting a webpage, a contact telephone number with the published tracking telephone number. The main flow diagram of FIG. 4 is described first, followed by description of associated subprocesses shown in FIGS. 4A and 4B.

The process 400 begins at step 402 when a client browser receives customized JavaScript (see, e.g., item 324, FIG. 3). The client browser application executing the script begins a process 404 of finding on the webpage any contact telephone numbers listed in the script. The client browser application then initializes 406 tracking communications with the FE server. For example, the client browser application opens 408 a WebSocket or representational state transfer (REST) web services connection via asynchronous JavaScript and XML (AJAX). Upon finding a contact telephone number and setting up the proper communications, the client browser application registers 410 with the FE server that a number has been or soon will be published.

The client browser application processes 412 completed (or partly completed) forms modified by a webpage visitor. The application also tracks 414 the user by swapping 416 back the original number under certain circumstances explained in the following paragraph, sending 418 information indicating whether the user is active (e.g., moving a pointer), and sending any form data (which often has personal information identifying the user) that can be aggregated with other tracking information.

After some period of inactivity, a published tracking telephone number is removed as a substitute and made available back in a FIFO queue for the appropriate pool. As described previously, when selecting a tracking telephone number from the pool, the tracking telephone number that has been in the pool the longest (i.e., the oldest number to be presented to a webpage visitor) is the number that is selected. As time goes on—say 50 minutes passes—numbers of the pool are cycled through publication to various webpage visitors. Eventually, an undersized FIFO queue may wrap to reach a previously published tracking telephone number. This means that potentially two people having active sessions are published the same tracking telephone number. But if somebody calls that number, chances are it will be the person that was published that number most recently. Nevertheless, the caller could be the visitor that was initially presented with the number because the caller may be a user that is just sitting on a webpage for 50 minutes. Thus, the process 400 includes some features to assess whether somebody has been idle on a webpage with a tracking telephone number. And if they are idle for too long (a certain period of time), the client browser application unswaps that tracking telephone number until the user becomes active again, in which case a new tracking telephone number may be provided.

FIG. 4A shows a process 404 of publishing tracking telephone numbers. The client browser application strips 422 all non-numeric characters from a document object model (DOM) of the webpage. Then, the client browser application searches 424 for a string (or multiple strings, e.g., if there are multiple pools) having digits matching those of previously configured contact telephone numbers. The client browser then uses a character index from the original DOM by which to replace 426 the found string with corresponding selected tracking telephone number. The swap is made at the location in the DOM such that the tracking telephone number may be rendered with the same formatting as would have been used to render the now-replaced contact telephone number.

FIG. 4B shows a process 412 of processing full and partial form submission. The client browser first identifies 428 a form in the DOM. If it is determined 430 to be an old form, then the form information is simply provided 432 to the FE server so that the server can enter that information in the database. Otherwise, the client browser signals to the FE server to create 434 a new form entry in the database by which to track activity of the new form.

Figure 5:
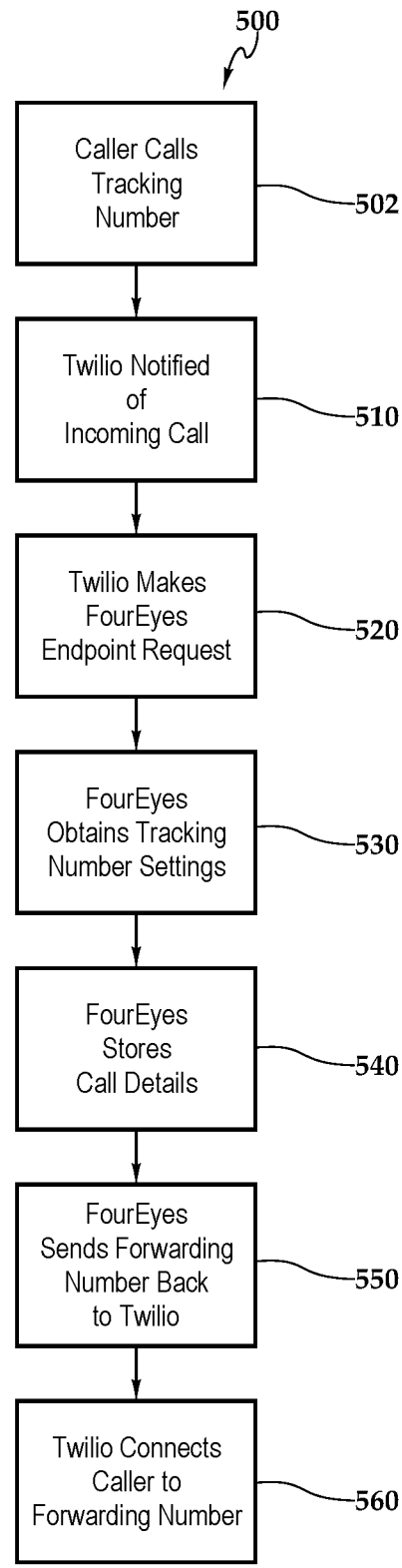
FIG. 5 is a flow diagram showing a process of handling a telephone call placed by a caller to a published tracking telephone number such that the telephone call is non-disruptively forwarded to a contact telephone number for the purpose of identifying website activities as being those of the caller.

FIG. 5 is a flow diagram showing a process 500 of handling a telephone call placed by a caller to a published tracking telephone number such that the telephone call is non-disruptively forwarded to a contact telephone number for the purpose of identifying website activities as being those of the caller. The following description of the process 500 explains in greater detail how FourEyes is able to both associate incoming website calls to the visitor (caller), and also non-obstructively connect the caller to whatever phone number was replaced by the tracking telephone number on the webpage.

At step 502, the webpage visitor (caller) makes a call to the FourEyes tracking number published on the webpage.

At step 510, when the caller calls the tracking number, Twilio (or another third-party call processor) is notified of the incoming call.

At step 520, Twilio makes an HTTP endpoint request to a FourEyes URL, sending details of the call and tracking number information with the request. Call details include caller information such as a caller's telephone number, name, city, and state. Tracking number information includes tracking telephone number, a unique tracking number identifier, or other relevant information by which to associate the caller with the tracking telephone number.

At step 530, the FourEyes endpoint receives the call details, and uses this information to obtain tracking number settings. Two primary settings are (a) what webpage visitor to associate with the call, and (b) what telephone number to forward the call. These settings are obtained as follows.

FourEyes searches its call database to determine if the caller's phone number has called the tracking phone number in the past. If yes, then FourEyes associates the call to the same website visitor that was associated with the previous call. FourEyes then uses the same forwarding number that the previous call had been forwarded to. If no, then FourEyes looks in its tracking telephone number publishing database to determine the website visitor who was last published the tracking telephone number, and associates the call to that website visitor. FourEyes then uses the website telephone number associated with the tracking telephone number's publication record (the original telephone number that was replaced by the tracking telephone number) as the forwarding telephone number.

At step 540, FourEyes stores the call details (sent by Twilio), a reference to the website visitor, and the forwarding telephone number, in a telephone call database.

At step 550, FourEyes returns an XML file back to Twilio that specifies the telephone number for which Twilio should forward the call.

At step 560, Twilio receives the XML file and connects the caller to the specified forwarding telephone number.

FIGS. 6 and 7 show optional reporting tools available as a user interface for account holders. For example, FIG. 6 shows an illustration of a summary view user interface 600 that indicates a prospect named Bill Smith has made several calls, submitted several forms, and viewed various webpages advertising a particular make and model of vehicle. Likewise, FIG. 7 shows a detail view user interface 700 that includes a chronological stream of the aforementioned activities of Bill Smith. To determine whether Bill Smith is a viable potential buyer, sales agents are provided these reports showing a potential buyer's website activity and call history. For example, an auto dealership sales agent can then review the reports and assess whether a previous caller has recently visited a webpage advertising a vehicle that is for sale. If so, then the agent can readily ascertain that the previous caller—perhaps someone who called three weeks earlier—is back today visiting the website and is still looking for a certain type of car that is for sale.

In another embodiment, reports concerning website activity are automatically pushed to a sales person in response to the potential buyer revisiting the website. The UTS automatically recognizes that the sales agent should follow-up by placing a telephone call to the previous caller. In other words, the website activity is used to automatically supplement a customer relationship management (CRM) system.

Figure 8:
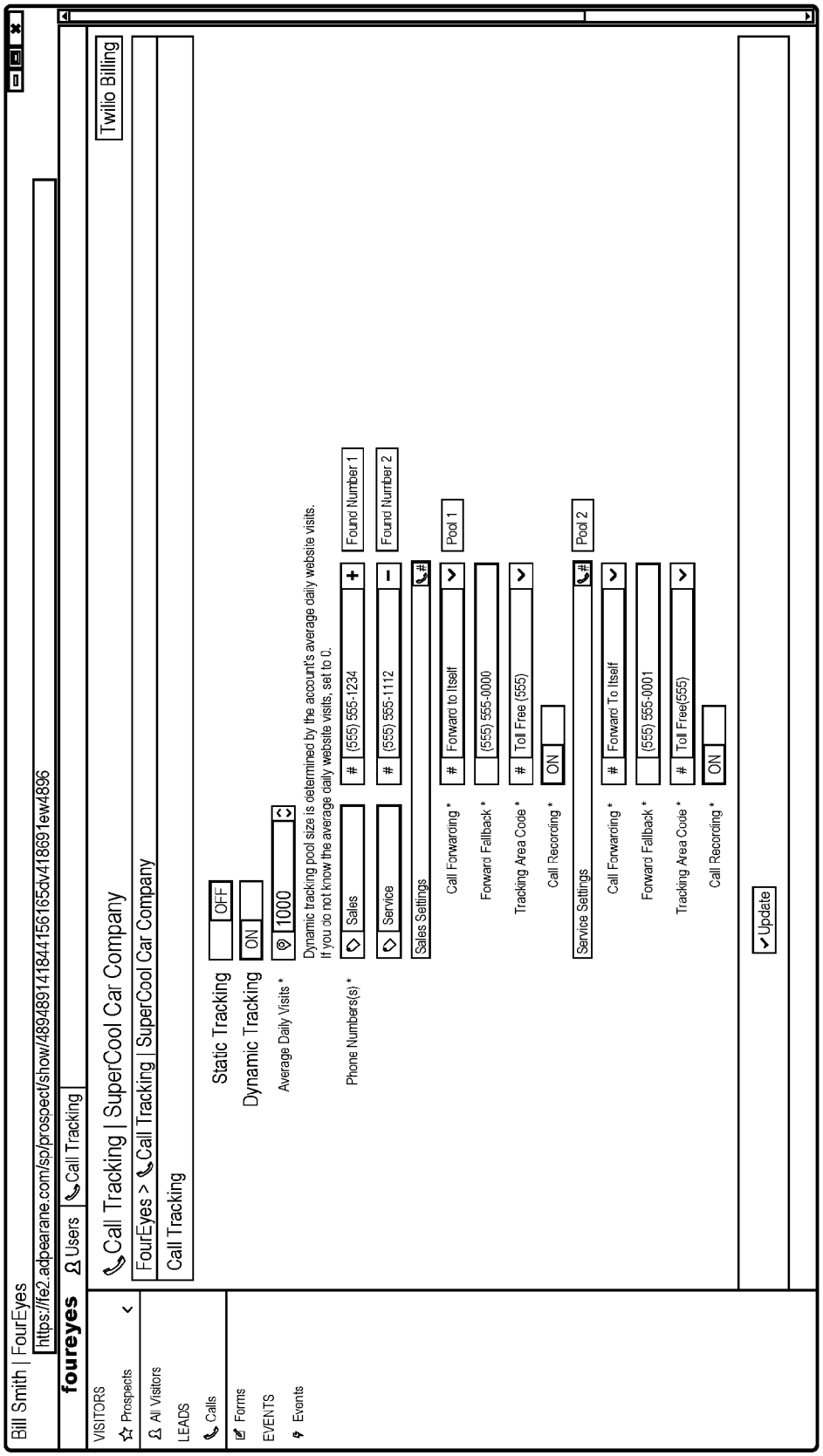
FIG. 8 is an illustration of a screenshot of a tracking system user interface showing a configuration setting webpage used for the purpose of establishing pools of tracking telephone numbers allocated from a set of telephone numbers previously obtained from a provider of telephony infrastructure configured to facilitate connectivity between networked devices and a PSTN.

FIG. 8 shows another illustration of a user interface 800 that is used to identify contact telephone numbers to track, allocate pools for the identified numbers, and establish routing instructions for the various pools. For example, a sales desk number is typically (555) 555-1234, and a service desk number is (555) 555-1112. Accordingly, there are two pools. The settings for the so-called "sales" pool are shown above the settings for the "service" pool. When a caller places a call to a tracking telephone number of the sales pool, then the call is forwarded to "itself" (i.e., the 1234 number). In other embodiments, the call can be forwarded to some other telephone number listed in the "Call Forwarding" field. If no one answers, or the call to the 1234 number cannot be connected, the call is routed to the "Forward Fallback" number. This number may reach, for example, a reception desk. Call recording may also be enabled. And supplying an area code in the settings page tells FourEyes what area code to request when purchasing the tracking numbers—if "844" is supplied, then FourEyes attempts to purchase tracking telephone numbers beginning with the 844 area code. Finally, an average number of daily visits is configured on the interface 800, which establishes the quantity of tracking numbers allocated to the pools, according to one embodiment.

The interface 800 also includes a "Static" option. Activating this option allows tracking telephone number to be used without associating them with website activity. For example, the so-called static tracking telephone numbers are provided for classic, non-web-based tracking. In other words, an account holder may use numbers of this type to track or record calls, but no website activity is associated with the static numbers. An example use of a static number would be an auto dealership or other advertiser placing the static number on print material to assess market interest. The option for "Dynamic" numbers allows the numbers to be published on webpages.

Skilled persons will understand that many changes may be made to the details of the above-described embodiments without departing from the underlying principles of the invention. The scope of the present invention should, therefore, be determined only by the following claims.

The invention claimed is:

1. In a website including a contact telephone number configured to be presented as formatted content of a webpage of the website, a method of identifying website activities of a webpage visitor as being those of a caller placing a telephone call to a published tracking telephone number presented as a substitute for the contact telephone number, the published tracking telephone number being presented as the substitute so that when the webpage visitor observes the published tracking telephone number and acts as the caller, the telephone call is non-disruptively forwarded to the contact telephone number for purpose of identifying the website activities as being those of the caller, the method comprising:

obtaining a set of telephone numbers from a provider of telephony infrastructure, the telephony infrastructure configured to facilitate connectivity between networked devices and a public switched telephone network (PSTN);

allocating from the set of telephone numbers a pool of tracking telephone numbers available as substitutes for the contact telephone number, the pool of tracking telephone numbers sized to include a quantity of numbers that is based on traffic volume of the webpage;

providing, for transmission from a website server of the webpage to a client browser visiting the webpage, a first set of machine-readable instructions that, when performed by the client browser, configure the client browser to communicate with a tracking system and obtain from it further instructions to swap, in response to the webpage visitor visiting the webpage, the contact telephone number with the published tracking telephone number selected by the tracking system from the pool of tracking telephone numbers such that the published tracking telephone number appears in the webpage as the formatted content;

storing in a database of the tracking system information indicating that the published tracking telephone number has been presented to the webpage visitor as the substitute for the contact telephone number;

tracking the website activities defined by actions of the webpage visitor taken on the website, the website activities including webpages visited and referral source;

providing, for configuring a call-processing application server of the provider of the telephony infrastructure, a second set of machine-readable instructions that, when performed by the call-processing application server, configure the call-processing application server to send a network request to the tracking system in response to receiving the telephone call placed to the published tracking telephone number, the network request including information identifying the published tracking telephone number and caller details, the caller details including a caller telephone number originating the telephone call, a name associated with the caller telephone number, and a geographic location associated with the caller telephone number;

in response to receiving the network request, searching the database for the published tracking telephone number to retrieve the contact telephone number associated with it and to associate the caller details with the webpage visitor and website activities thereof; and providing to the call-processing application server the contact telephone number retrieved from the database to thereby cause the call-processing application server to forward the telephone call to the contact telephone number.

2. The method of claim 1, further comprising searching the database to determine whether the caller telephone number had been associated with a previous website visitor that had used the caller telephone number to make a previous telephone call to the published tracking telephone number.

3. The method of claim 2, further comprising identifying the caller as the previous website visitor.

4. The method of claim 2, further comprising providing to the call-processing application server the contact telephone number that had been used for the previous website visitor.

5. The method of claim 1, further comprising storing in the database the caller details and a reference to the webpage visitor.

6. The method of claim 1, further comprising selecting the published tracking telephone number from the pool of tracking telephone numbers by identifying a previously published tracking telephone number having an oldest publication time.

7. The method of claim 1, further comprising providing the contact telephone number by communicating to the call-processing application server a third set of machine-readable instructions listing the contact telephone number.

8. The method of claim 1, further comprising reporting the website activities to a recipient of the telephone call.

9. The method of claim 1, further comprising determining the traffic volume based on a number of visits that the webpage receives in a defined period.

10. The method of claim 1, in which the webpage visitor comprises a first webpage visitor, the method further comprising, in response to detecting a period of inactivity of the first webpage visitor on the webpage, reusing the published tracking telephone number for a second webpage visitor that is different than the first webpage visitor.

11. The method of claim 1, further comprising:

determining whether a webpage visitor is an Internet bot web crawler; and suppressing publication of a tracking telephone number in response to determining that the webpage visitor is an Internet bot web crawler.

* * * * *